(12) United States Patent
Yamamoto

(10) Patent No.: US 9,511,479 B2
(45) Date of Patent: Dec. 6, 2016

(54) APPARATUS FOR PROCESSING AN OBJECT BY PROJECTING SHOTS THEREON

(75) Inventor: Masatoshi Yamamoto, Toyokawa (JP)

(73) Assignee: SINTOKOGIO, LTD., Nagoya-Shi, Aichi (JP)

( * ) Notice: Subject to any disclaimer, the term of this patent is extended or adjusted under 35 U.S.C. 154(b) by 106 days.

(21) Appl. No.: 14/361,850

(22) PCT Filed: Jul. 12, 2012

(86) PCT No.: PCT/JP2012/067783
§ 371 (c)(1),
(2), (4) Date: May 30, 2014

(87) PCT Pub. No.: WO2013/108427
PCT Pub. Date: Jul. 25, 2013

(65) Prior Publication Data
US 2014/0329444 A1    Nov. 6, 2014

(30) Foreign Application Priority Data
Jan. 19, 2012  (JP) ................................ 2012-009421

(51) Int. Cl.
  B24C 9/00   (2006.01)
  B24C 7/00   (2006.01)
  B24C 1/10   (2006.01)
(52) U.S. Cl.
  CPC ............... *B24C 9/006* (2013.01); *B24C 1/10* (2013.01); *B24C 7/0046* (2013.01); *Y02P 70/179* (2015.11)
(58) Field of Classification Search
  CPC .............. B24C 9/00; B24C 9/006; B24C 7/00; B24C 7/0046
(Continued)

(56) References Cited

U.S. PATENT DOCUMENTS 1,858,475 A * 5/1932 Wolever ................ B24C 7/0046
  451/90
3,073,070 A * 1/1963 Mead .................... B24C 7/0053
  451/2
(Continued)

FOREIGN PATENT DOCUMENTS

CN   102107396 A   6/2011
JP   2005-074563   3/2005
(Continued)

OTHER PUBLICATIONS

English-language International Search Report from the Japanese Patent Office for International Application No. PCT/JP2012/067783, mailing date Aug. 21, 2012.
(Continued)

*Primary Examiner* — Robert Rose
(74) *Attorney, Agent, or Firm* — Finnegan, Henderson, Farabow, Garrett & Dunner, L.L.P.

(57) ABSTRACT

To provide a apparatus for processing an object by projecting shots thereon that can be downsized and can use shots of appropriate sizes. A pressure tank 42 is disposed below a position 24X where an object to be processed 12 is projected. The shots that have been projected are received by the tank 42. The discharging portion of the tank 42 is communicated with a device for projecting shots. One end of a piping for transporting air for a discharge 54 that can suction shots is connected to a position between the position 24X and the tank 42. The other end of the piping 54 is connected to a separator 68. The separator 68 is connected to one end of the piping for transporting air for a supply 76 that can suction shots. The other end of the piping 76 is communicated with the room for projecting the shots 16.

8 Claims, 13 Drawing Sheets

(58) Field of Classification Search
USPC .......................... 451/87, 88, 89, 75, 99, 100
See application file for complete search history.

(56) References Cited

U.S. PATENT DOCUMENTS

| | | | | |
|---|---|---|---|---|
| 3,672,292 A * | 6/1972 | Arnold | .................... | B24C 9/003 451/87 |
| 6,238,268 B1 * | 5/2001 | Wern | ........................ | B24C 1/10 451/36 |
| 6,878,046 B2 * | 4/2005 | Publ | ......................... | B24C 9/00 451/36 |

FOREIGN PATENT DOCUMENTS

| | | |
|---|---|---|
| JP | 2010-058247 | 3/2010 |
| JP | 2010-105052 | 5/2010 |
| JP | 2011-079121 | 4/2011 |

OTHER PUBLICATIONS

Office Action for CN Application No. 201280058563.5 dated Nov. 4, 2015 (2 pages).
Extended European Search Report for corresponding EP Application No. 12866065.1 dated Apr. 18, 2016.

* cited by examiner

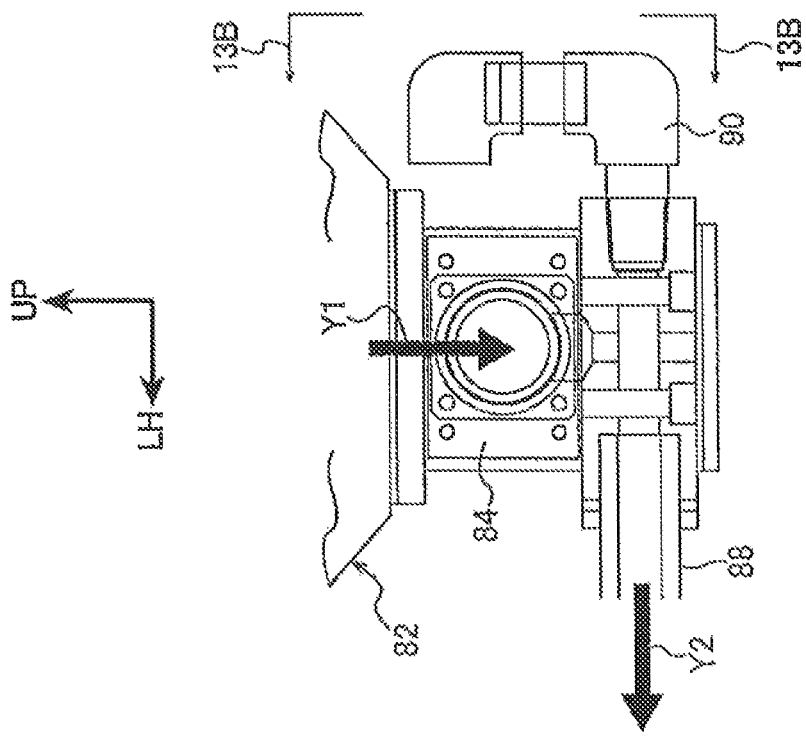
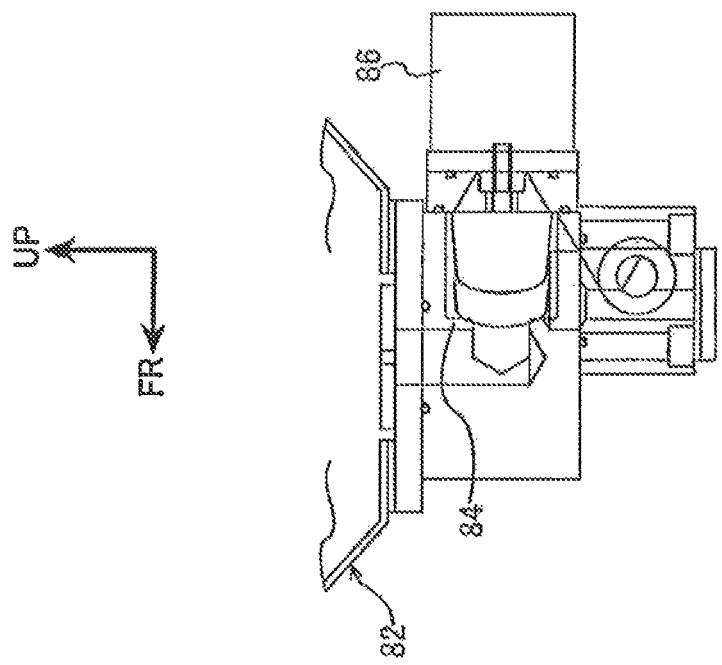
Fig. 13

APPARATUS FOR PROCESSING AN OBJECT BY PROJECTING SHOTS THEREON

TECHNICAL FIELD

The present invention relates to an apparatus for processing an object by projecting shots thereon.

BACKGROUND ART

An apparatus for processing an object projecting shots thereon, which apparatus comprises a circulating machine for collecting shots that have been projected and circulating them after removing impurities from them, has been known (for example, see Japanese Patent Laid-open Publication No. 2011-079121).

However, there is room for improving such an apparatus by downsizing the apparatus and using shots of appropriate sizes.

Considering the state of the art, the objects of the present invention are to provide an apparatus for processing an object by projecting shots thereon that can be downsized and can use shots of appropriate sizes.

DISCLOSURE OF INVENTION

An apparatus for processing an object by projecting shots thereon of the first aspect of the present invention comprises a device for projecting shots (hereafter, a "projecting device"), a pressure tank, a first piping, a separator, and a second piping. The projecting device projects shots on an object to be processed that is located in a room for projecting the shots. The pressure tank, which is disposed below the projecting position where the object is projected by the projecting device, receives shots that have been projected. It is configured to be pressurized inside, and has an outlet that is communicated with a route for supplying the shots in the projecting device. The first piping has one end that is disposed between the projecting position and the pressure tank and can suction the shots near the one end. The separator, which is connected to the other end of the first piping, separates and removes foreign substances from a mixture that contains the suctioned shots and powdery foreign substances and discharges the mixture other than the foreign substances through a discharging port, wherein the foreign substances have particles that have different sizes than those of the shots. The second piping has one end that is connected to the discharging port of the separator. Its other end is located above the pressure tank and communicated with a space that is connected to the pressure tank. The second piping can discharge the shots from the other end. The wording "is connected to the other end of the first piping" means not only being directly connected to the first piping, but also being connected to the first piping via any other member (for example, via a box for collection 78A and a pipe 78B, which are discussed below). The wording "one end that is connected to the discharging port of the separator" means not only where the one end is directly connected to the discharging port of the separator, but also where the one end is connected to the discharging port of the separator via any other member (for example, a box for a discharge 78c, which is discussed below).

By the apparatus for processing an object by projecting shots thereon of the first aspect, shots are projected on an object to be processed in the room for projecting the shots by the projecting device. The pressure tank is disposed below the projecting position where the object is projected by the projecting device. The shots that have been projected are received by the pressure tank. The pressure tank is configured to be pressurized. Further, the discharging portion is communicated with the route for supplying the shots of the projecting device. Thus the shots received in the pressure tank are returned to the projecting device to be reused.

The one end of the first piping is disposed between the projecting position and the pressure tank. Since the first piping can suction the shots near that one end, the shots near the one end are suctioned by the first piping. The other end of the first piping is connected to the separator. The mixture that includes the shots and powdery foreign substances that are suctioned into the first piping is caused to flow to the separator. Then, the foreign substances, having particles that have different sizes, are separated and removed by the separator. Substances other than the foreign substances are discharged from the discharging port of the separator. The discharging port of the separator is connected to the one end of the second piping. The other end of the second piping is disposed in a space that is located above the pressure tank and that is communicated with it. The second piping can discharge the shots from the other end. Thus the shots that are discharged from the other end of the separator and are appropriate in size are discharged from the second piping to be supplied to the pressure tank. In addition, since no large circulating is installed, the apparatus can be downsized.

By the apparatus for processing an object by projecting shots thereon of the second aspect of the present invention, a hopper for receiving shots that have been projected is disposed between the projecting position and the pressure tank. The one end of the first piping is connected to the hopper in the apparatus of the first aspect.

By the apparatus for processing an object by projecting shots thereon of the second aspect, since the hopper for receiving the shots that have been projected is disposed between the projecting position and the pressure tank and the one end of the first piping is connected to the hopper, the shots that have been projected are effectively suctioned from the one end of the first piping.

By the apparatus for processing an object by projecting shots thereon of the third aspect of the present invention, in the apparatus of the first or second aspect, at the other end of the first piping an ejector is provided to cause gas to flow into the first piping toward the other end, and at the one end of the first piping a suction piping and a container-like receiver that receives shots below the suction piping are provided. The suction piping is almost horizontally disposed in the room for projecting the shots and has a plurality of holes on the outer circumference of the piping, which holes open downwardly.

By the apparatus for processing an object by projecting shots thereon of the third aspect, since an ejector is provided at the other end of the first piping and gas is caused to flow in the first piping toward the one end, the shots and air that exist near the one end are suctioned into the first piping. At the one end of the first piping the suction piping is almost horizontally disposed in the room for projecting the shots and has a plurality of holes on the outer circumference of the piping, which holes open downwardly, and the container-like receiver receives shots below the suction piping. Thus the shots that are received in the receiver are suctioned through the plurality of holes of the suction piping. Air is suctioned through the opening of the one end of the suction piping. Therefore, the shots flow through the first piping while they are mixed with the air.

By the apparatus for processing an object by projecting shots thereon of the fourth aspect of the present invention, in the apparatus of the third aspect, an upper cover is provided above the suction piping, which cover covers the upper portion of the suction piping in the room for projecting the shots and is shaped as an inverted V in a cross-section perpendicular to the axis of the suction piping.

By the apparatus for processing an object by projecting shots thereon of the fourth aspect, since the upper cover that covers the upper portion of the suction piping in the room for projecting the shots is provided, the shots that have been projected bump the upper cover when they drop to the side of the one end of the first piping. Thus abrasion of the suction piping is prevented. Since the upper cover is shaped as an inverted V in a cross-section perpendicular to the axis of the suction piping, the shots that have bumped the upper cover drop at the side, which is a little distant from the suction piping. Therefore, the suction piping is seldom buried in the shots.

By the apparatus for processing an object by projecting shots thereon of the fifth aspect of the present invention, in the apparatus of any of the first to the fourth aspects, the one end of the first piping outside the room for projecting the shots is connected to a piping for introducing fresh air. Fresh air outside the room for projecting the shots can be introduced into the first piping through the piping for introducing fresh air.

By the apparatus for processing an object by projecting shots thereon of the fifth aspect, the one end of the first piping outside the room for projecting the shots is connected to the piping for introducing fresh air, and fresh air outside the room for projecting the shots can be introduced into the first piping through the piping for introducing fresh air. Thus, even if the one end of the first piping would be almost completely clogged by the shots, suctioning shots can be maintained by introducing air from the piping for introducing fresh air to the side of the one end of the first piping.

The apparatus for processing an object by projecting shots thereon of the sixth aspect of the present invention comprises a box that constitutes a room other than the room for projecting the shots and that is communicated with the room for projecting the shots, wherein the other end of the second piping is connected to the box, in the apparatus of any of the first to the fifth aspects.

By the apparatus for processing an object by projecting shots thereon of the sixth aspect, since it comprises the box that constitutes a room other than the room for projecting the shots and that is communicated with the room for projecting the shots and the other end of the second piping is connected to the box, the shots that have been projected in the room for projecting the shots are prevented from entering the other end of the second piping or the chances of doing so are effectively decreased. Thus the shots of appropriate sizes that are discharged from the discharging port of the separator are more stably discharged from the other end of the second piping.

The apparatus for processing an object by projecting shots thereon of the seventh aspect of the present invention comprises a tank for resupplying shots (hereafter, a "resupplying tank") and a third piping having one end that is connected to a discharging portion of the resupplying tank and the other end that is disposed in a space above the pressure tank to be communicated with the pressure tank, wherein the third piping can discharge the shots from the other end, in the apparatus of any of the first to the sixth aspects. The wording "having one end to connect a discharging portion of the resupplying tank" means not only where the one end is directly connected to the discharging portion of the resupplying tank, but also where the one end is connected to the discharging portion via any other member (for example, a shutoff valve 84, which is discussed below).

By the apparatus for processing an object by projecting shots thereon of the seventh aspect, the discharging portion of the resupplying tank, which can resupply shots, is connected to the one end of the third piping. The other end of the third piping is disposed in the space above the pressure tank to be communicated with it. The third piping can discharge the shots from the other end. Thus the shots of appropriate sizes that are supplied from the resupplying tank are supplied from the other end of the third piping to the pressure tank.

The apparatus for processing an object by projecting shots thereon of the eighth aspect of the present invention comprises a box that constitutes a room other than the room for projecting the shots and that is communicated with room for communicated with the shots, wherein the other end of the third piping is connected to the box, in the apparatus of the seventh aspect.

The box of the eighth aspect may be the same as, or different from, the box of the sixth aspect.

By the apparatus for processing an object by projecting shots thereon of the eighth aspect, the box that constitutes a room other than the room for projecting the shots and that is communicated with the room for projecting the shots is provided. The box is connected to the other end of the third piping. Thus the shots that have been projected are prevented from entering the other end of the third piping, or the chances of doing so are effectively decreased. Thus the shots of appropriate sizes that are supplied from the resupplying tank are more stably discharged from the other end of the third piping.

The apparatus for processing an object by projecting shots thereon of the ninth aspect of the present invention comprises a door that is provided on a gate for carrying the object to be processed in and out of the room for projecting the shots and a fourth piping that has one end to be disposed below the door and the other end that is disposed in a space that is located above the pressure tank and that is communicated with the pressure tank, wherein the fourth piping can discharge the shots from the other end, in the apparatus of any of the first to the eighth aspects.

By the apparatus for processing an object by projecting shots thereon of the ninth aspect of the present invention, a door is provided to the gate for carrying the object to be processed in and out of the room for projecting the shots. The one end of the fourth piping is disposed below the door. The other end of the fourth piping is disposed in a space above the pressure tank and is communicated with it. The fourth piping can discharge the shots from the other end. Thus the shots that have dropped below the door are supplied from the other end of the fourth piping to the pressure tank.

As discussed above, by the apparatus for processing an object by projecting shots thereon of the present invention, remarkable advantages in downsizing the apparatus and using the shots of appropriate sizes are obtained.

The basic Japanese patent application, No. 2012-009421, filed Jan. 19, 2012, is hereby incorporated by reference in its entirety in the present application. The present invention will become more fully understood from the detailed description given below. However, the detailed description and the specific embodiments are only illustrations of the desired embodiments of the present invention, and so are given only for an explanation. Various possible changes and modifications will be apparent to those of ordinary skill in the art on the basis of the detailed description. The applicant has no intention to dedicate to the public any disclosed embodiment. Among the disclosed changes and modifications, those which may not literally fall within the scope of the present claims constitute, therefore, a part of the present invention in the sense of the doctrine of equivalents. The use of the articles "a," "an," and "the" and similar referents in the specification and claims are to be construed to cover both the singular and the plural, unless otherwise indicated herein or clearly contradicted by the context. The use of any and all examples, or exemplary language (e.g., "such as") provided herein is intended merely to better illuminate the invention, and so does not limit the scope of the invention, unless otherwise stated.

BRIEF DESCRIPTION OF DRAWINGS

FIG. 7(A) is a plan view, FIG. 7(B) a left-side view, and FIG. 7(C) a front view.

FIG. 8(A) is a front view, FIG. 8(B) is a cross-sectional view taken along the line 8B-8B in FIG. 8(A), FIG. 8(C) is a cross-sectional view taken along the line 8C-8C in FIG. 8(A), and FIG. 8(D) is a cross-sectional view taken along the line 8D-8D in FIG. 8(A).

FIG. 13 illustrates the lower portion of the resupplying tank of the shot-peening apparatus of an embodiment of the present invention. FIG. 13(A) is a schematic structural drawing showing a front view of the apparatus and FIG. 13(B) is a view taken along the arrows 13B-13B in FIG. 13(A).

BEST MODE FOR CARRYING OUT THE INVENTION

The Configuration of an Embodiment

A shot-peening apparatus 10, which is an apparatus for processing an object by projecting shots thereon as an embodiment of the present invention, is discussed with reference to FIGS. 1 to 13. The arrows FR, UP, and LH, which are shown in some of these drawings, denote the proximal side, the upper side, and the left side, respectively, in a front view of the apparatus. The drawings show the inside of the apparatus by removing an outside plate of it or cutting a part of the outside plate away.

Figure 1:
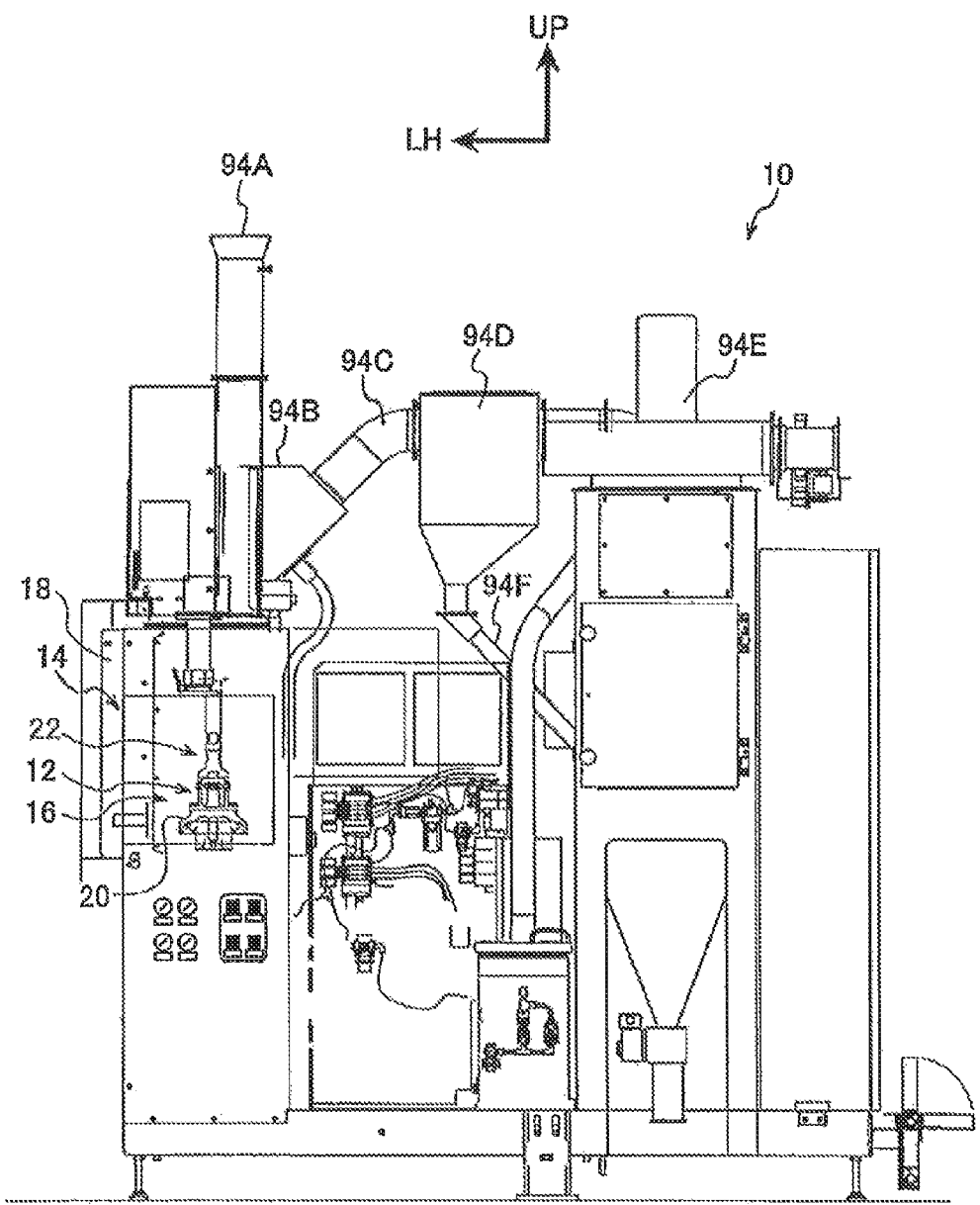
FIG. 1 illustrates a front view of the shot-peening apparatus of an embodiment of the present invention.
Figure 2:
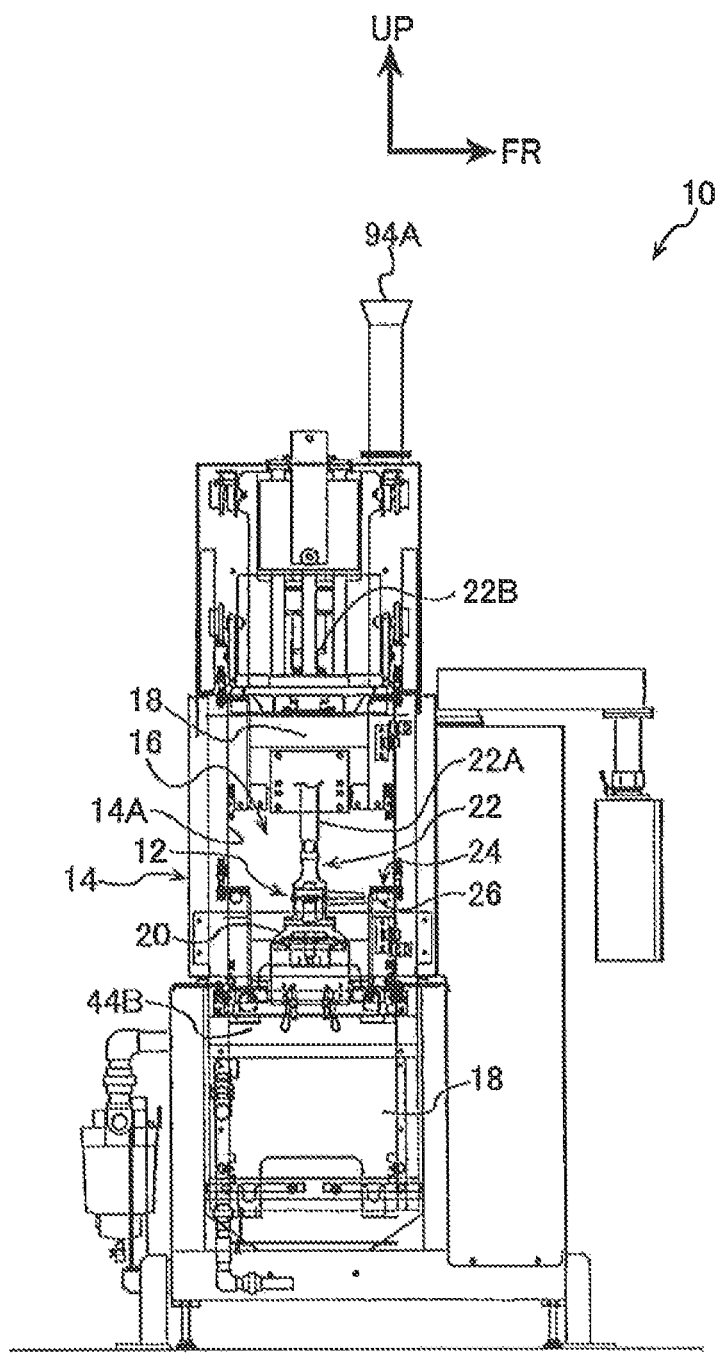
FIG. 2 illustrates a left-side view of the shot-peening apparatus of an embodiment of the present invention.
Figure 3:
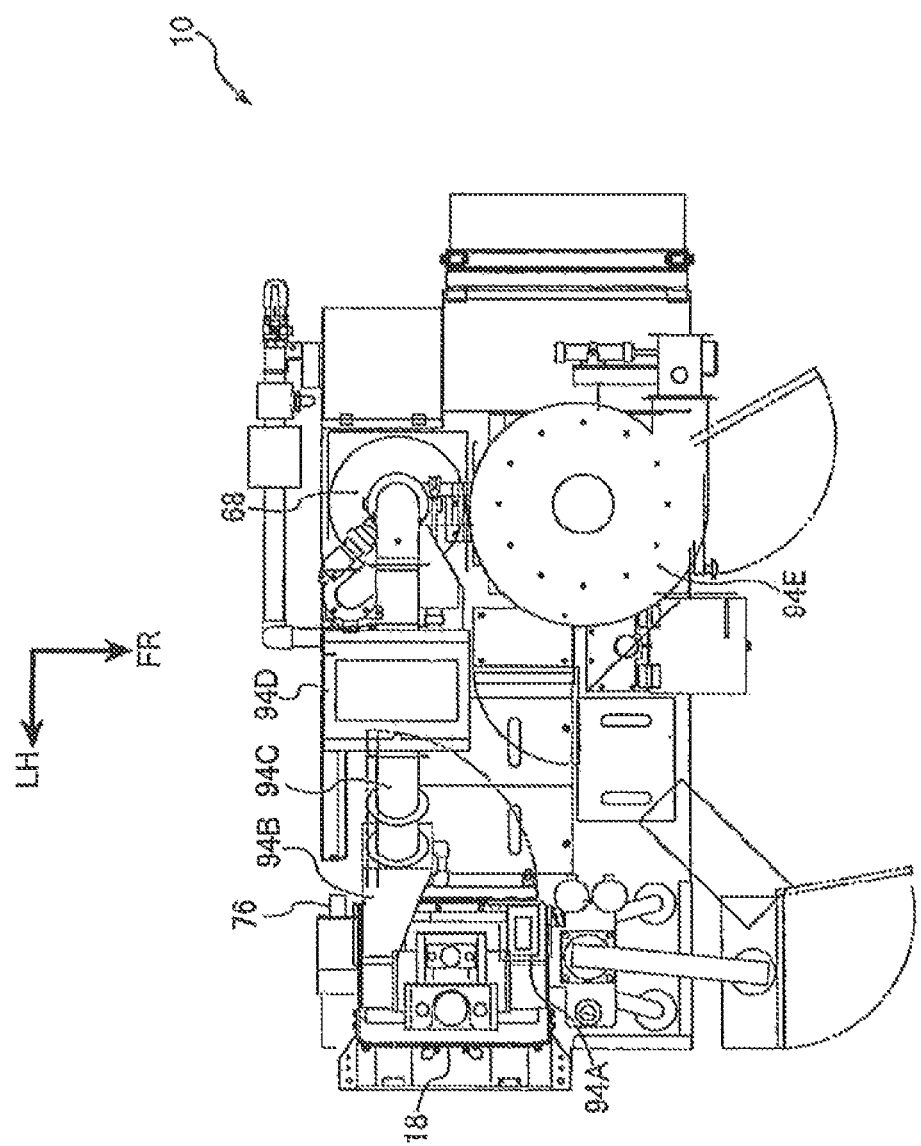
FIG. 3 illustrates a plan view of the shot-peening apparatus of an embodiment of the present invention.

FIG. 1 illustrates a front view of the shot-peening apparatus 10, FIG. 2 a left-side view, and FIG. 3 a plan view. An object to be processed (a work) 12 for the shot-peening apparatus 10 that is illustrated by these drawings is, for example, a gear.

As shown in FIG. 1, the shot-peening apparatus 10 comprises a cabinet 14. In the cabinet 14, a room for projecting the shots 16, where a surface treatment (shot peening for this embodiment) on an object to be processed 12 is done by shots, is formed. As shown in FIG. 2, a gate 14A for carrying an object to be processed 12 in and out of the room for projecting the shots 16 is formed on the cabinet 14. On the cabinet 14 an inspection door is provided at a position that faces the gate 14A, though it is not illustrated.

A door 18 (a door for carrying an object in and out of the room) is provided on the gate 14A to be opened and closed (to be moved up and down). The door 18 is disposed at the lower side of the gate 14A to move between a retracted position to open the gate 14A and a closing position to shut the gate 14A. Both sides of the door 18 are connected to roller chains that are vertically raised by cylinders via mechanisms for transmitting a driving force, though no detail is illustrated. For example, an arm, a link, a running block (a movable pulley), a standing block (a fixed pulley), or a chain wheel may be used for that mechanism for transmitting a driving force. If a running block that is driven by a cylinder via a roller chain is provided on the ceiling to drive the door 18, the height of a driver for the door 18 is reduced.

A table 20 that is nearly disc-shaped, and on which is mounted an object to be processed 12, is provided in the cabinet 14. The table 20 rotates about a shaft that has an axis in the vertical direction of the apparatus. That is, a bevel gear that is fixed to, and has the same axis as, the shaft is provided under the table 20 for driving it, though no detail is illustrated. The bevel gear engages another bevel gear, which is fixed to the shaft of a motor. The shaft of the motor is hollow and has a horizontal axis. It is rotated by a driving motor that has reduction gears. In this way the driver of the table 20 is downsized.

On the table 20 a holding mechanism 22 is disposed. The upper side of an object to be processed 12 is held by the holding mechanism 22. Below, the configuration of the holding mechanism 22 is outlined, though its details are not illustrated. The holding mechanism 22 can be downsized by having a cylinder with guide rods. The cylinder with guide rods has a vertical axis. It is integrated with a pair of guide rods that are fixed to the frame of the apparatus, have respective vertical axes, and are aligned in the front-to-back direction of the apparatus. One end of a rod is fixed to the piston that is inside that cylinder with guide rods. The rod extends from the cylinder to the position under the apparatus. It is located between the pair of guide rods when viewed from the front of the apparatus.

The axis of the rod is in the vertical direction of the apparatus. The rod is integrated with a pair of holders that are aligned in the front-to-back direction of the apparatus. The holders are guided by the guide rods to move up and down. The rod can move up and down vertically. A bearing is provided at the lower end of the rod. The bearing is connected to a holder 22A that holds the upper part of the object to be processed 12 on the table 20. The holder 22A extends vertically. It is held by the bearing so as to rotate about an axis that extends vertically. The holder 22A cannot move up and down vertically in relation to the bearing. Near the bearing a sensor for a rotation 22B and a seal for the shaft are provided. The sensor for the rotation 22B senses a rotation of the holder 22A, i.e., an object to be processed 12. It is connected to the control unit to display sensed data for a user's check.

The cylinder of the holding mechanism 22 is connected to an air source via a device for controlling the direction of an air flow (solenoid valve etc.), though no drawing illustrates such a configuration. The device for controlling the direction of an air flow is connected to the control unit. The control unit controls the device for controlling the direction of an air flow to control the direction of the cylinder to move up or down.

In this way the holding mechanism 22 holds the object to be processed 12 that is set on the table 20. Further, it causes the object to be processed 12 and the holder 22A to be driven by the rotation of the table 20. While the object to be processed 12 is rotated in this way, it is projected by the projecting device 24, which is discussed below.

By this embodiment, a liner, which is not shown, is provided to the inner surface of the cabinet 14 in the room for projecting the shots 16. A space is provided between the cabinet 14 and the liner to reduce the noise that is generated by the projecting by the projecting device 24.

As shown in FIGS. 1 and 3, in the shot-peening apparatus 10 dust that is generated by projecting shots is caused to flow, by air suctioned from a ventilator 94A, to the dust collector 94E through a port for sucking air out 94B, a duct 94C, and a settling chamber 94D. The dust is filtered by the dust collector 94E to exhaust only air. The dust collector 94 is a type of small one that has reduced areas for disposing a cartridge filter and a fan, though no details are illustrated. It is mounted on the main frame of the shot-peening apparatus 10. The settling chamber 94D is connected to a vibrating screen 68 (see FIG. 3) as a separator via a piping, etc. The shots that have been separated by the settling chamber 94D are caused to flow to the vibrating screen 68 (see FIG. 3).

Figure 4:
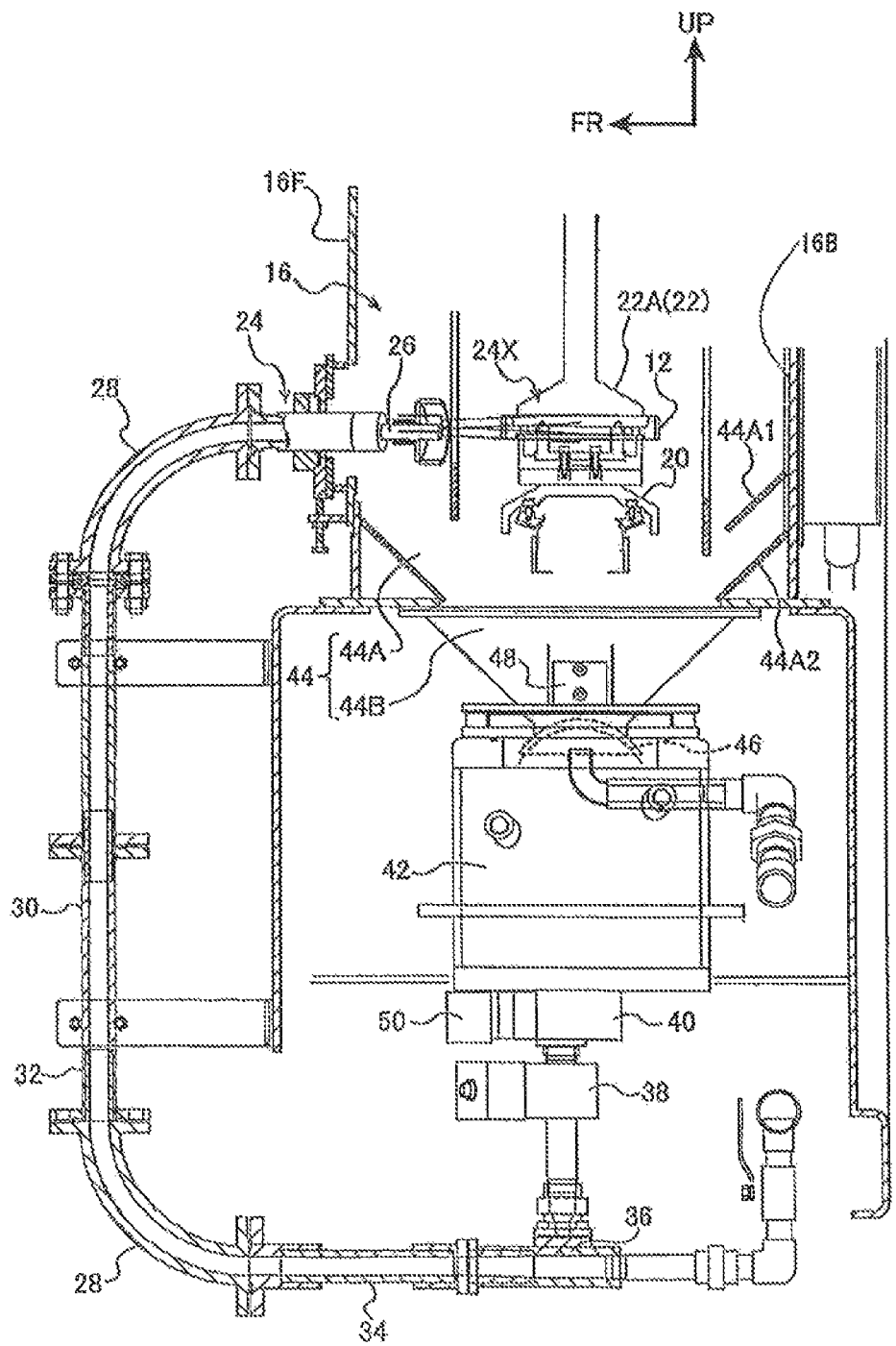
FIG. 4 is a right-side view of a schematic structural drawing showing the pressure tank, the projecting device, and their peripheries, of an embodiment of the present invention.

Next, with reference to FIG. 4, the projecting device 24 that projects shots against the object to be processed 12 in the room for projecting the shots 16 is discussed. The projecting device 24 of the present embodiment is a spray-type. It has a nozzle 26 that is attached to the front wall 16F of the room for projecting the shots 16. It sprays compressed air that contains shots from the nozzle 26 to project shots onto the object to be processed 12 in the room for projecting the shots 16. The nozzle 26 is connected to a mixing valve 36 through a bend made of cast steel 28, a steel pipe 30, a liner for steel pipes 32, and an anti-wear hose 34. The mixing valve 36 is connected to an air supply, which is not shown, and to a pressure tank 42 via a supplier of a constant amount of shots 38 via a shutoff valve 40. That is, the outlet of the pressure tank 42 is communicated with the route for supplying the shots to be pressurized, as discussed below. The mixing valve 36 mixes shots that are caused to flow from the supplier of a constant amount of shots 38 and compressed air that is caused to flow from the air supplier (the right side in the drawing).

This embodiment has a configuration in which the pressure tank 42 is connected to the supplier of a constant amount of shots 38 so that a plurality of projecting devices 24 can be installed with the single pressure tank 42 (see FIG. 7(A). Thus the shot-peening apparatus 10 is downsized in comparison with a configuration in which respective pressure tanks 42 are provided to a plurality of the projecting devices 24.

The pressure tank 42 is located below a projecting position 24X, where the object to be processed 12 is projected by the projecting device 24 so as to receive the shots that have been shot. A hopper 44 that receives the shots that have been projected is disposed between the projecting position 24X and the pressure tank 42.

The hopper 44 comprises an upper portion of the hopper 44A and a lower portion of the hopper 44B (also called "a shute"). The lower position 44B is located under the upper portion 44A. The upper portion 44A inclines toward the lower position of the apparatus inside the room for projecting the shots 16. On a back wall 16B of the room for projecting the shots 16 a pair of ramps 44A1, 44A2 that are vertically aligned are provided. The lower portion 44B has a shape that gradually narrows toward the lower position of the apparatus. The lower portion 44B is connected to the pressure tank 42 via a poppet valve 46.

By these configurations the shots that have processed the object to be processed 12 accumulate in the lower portion of the hopper 44B that is located under the table 20. When the poppet valve 46 is opened, those shots are caused to flow to the pressure tank 42.

The pressure tank 42 is equipped with a level gage to detect the amount of shots in the pressure tank 42, which level gage is not shown. The level gage is connected to the control unit. The control unit controls the poppet valve 46 to open it if the level gage detects that the amount of shots in the pressure tank 42 is less than a predetermined value. That is, the poppet valve 46 is driven by a driving cylinder 48 so that the opening and closing of it is controlled based on the detection of the level gage. When the poppet valve 46 is opened the shots are supplied to the pressure tank 42.

The shutoff valve 40, which is located under the pressure tank 42, is driven by a driving cylinder 50 so that the opening and closing of it is controlled by the control unit. To inject shots by the projecting device 24, the pressure tank 42 is caused by the control unit to contain an amount of shots that exceeds the predetermined value while the shutoff valve 40 is closed. Then the poppet valve 46 is closed so that the pressure tank 42 is pressurized. Then the shutoff valve 40 is opened so that shots are supplied to the supplier of a constant amount of shots 38. While compressed air is caused to flow to the mixing valve 36 a proper amount of the shots are supplied from the supplier of a constant amount of shots 38 to the mixing valve 36. Thus shots are accelerated by being mixed with the compressed air that flows through the mixing valve 36. The shots are projected from the nozzle 26 after passing through the anti-wear hose 34, the liner for steel pipes 32, the steel pipe 30, and the bend made of cast steel 28. In this way reused shots are shot onto the object to be processed 12 to process the object 12 by shot-peening.

Though no detail is discussed, in this embodiment a variety of equipment and sensors can be provided in view of stable projecting so as to control the projecting of shots from the nozzle 26, to control the upper and lower limits of the amount of air to be sprayed from the nozzle, to control the upper and lower limits of the amount of shots to be supplied by the supplier of a constant amount of shots 38, and to control the pressure in the pressure tank 42. Thus the control for stable projecting can be achieved. Further, additional equipment that maintains the records of that equipment and sensors can be selected. In this way a problem can be easily recognized when trouble in the shot peening of the object to be processed 12 occurs. The speed of projecting shots is determined by the amount of air to be sprayed, the pressure of the air, and the amount of shots. In this embodiment the ranges of these values to be used are narrowed so as to be precisely controlled. Though a stable supply of shots becomes difficult if the pressure in the pressure tank 42 differs from that in the mixing valve 36, in this embodiment the ranges of them are narrowed to improve the stability of shot-peening.

Figure 5:
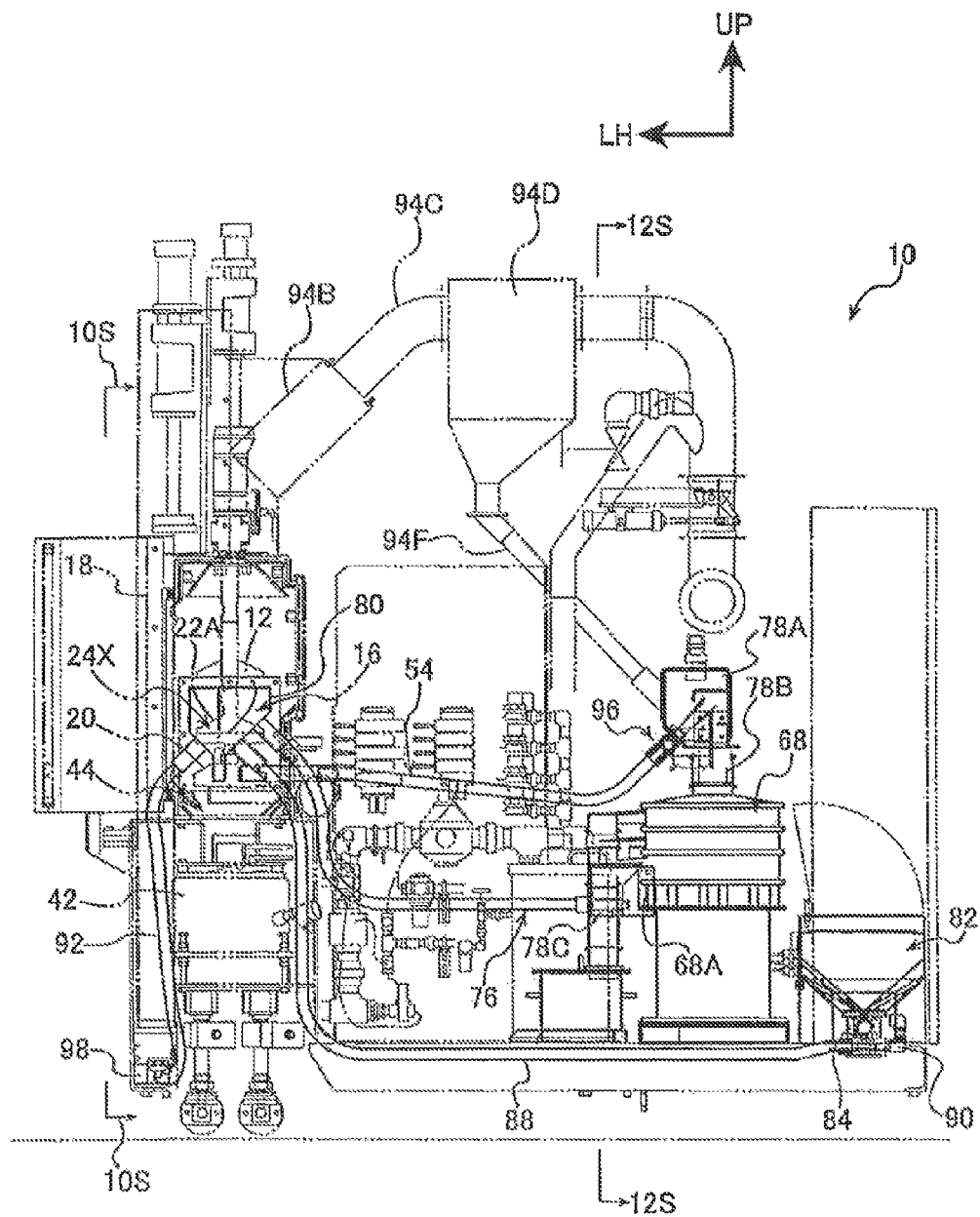
FIG. 5 is a front view of a schematic structural drawing to illustrate the system for circulation of an embodiment of the present invention. The structures other than the system for circulation are shown by two-dot chain lines.

FIG. 5 shows a schematic structural view of the front of the apparatus for illustrating a system for circulation (circulating shots) in the shot-peening apparatus 10. In this figure components other than the system for circulation are shown by two-dot chain lines. As shown in FIG. 5, the hopper 44 that is located between the projecting position 24X and the pressure tank 42 is connected to one end of a piping for transporting air for a discharge 54, which is the first piping. The piping for transporting air for a discharge 54 can suction shots near the one end (precisely, shots that exist near the opening of the one end in the room for projecting the shots 16).

Figure 7:
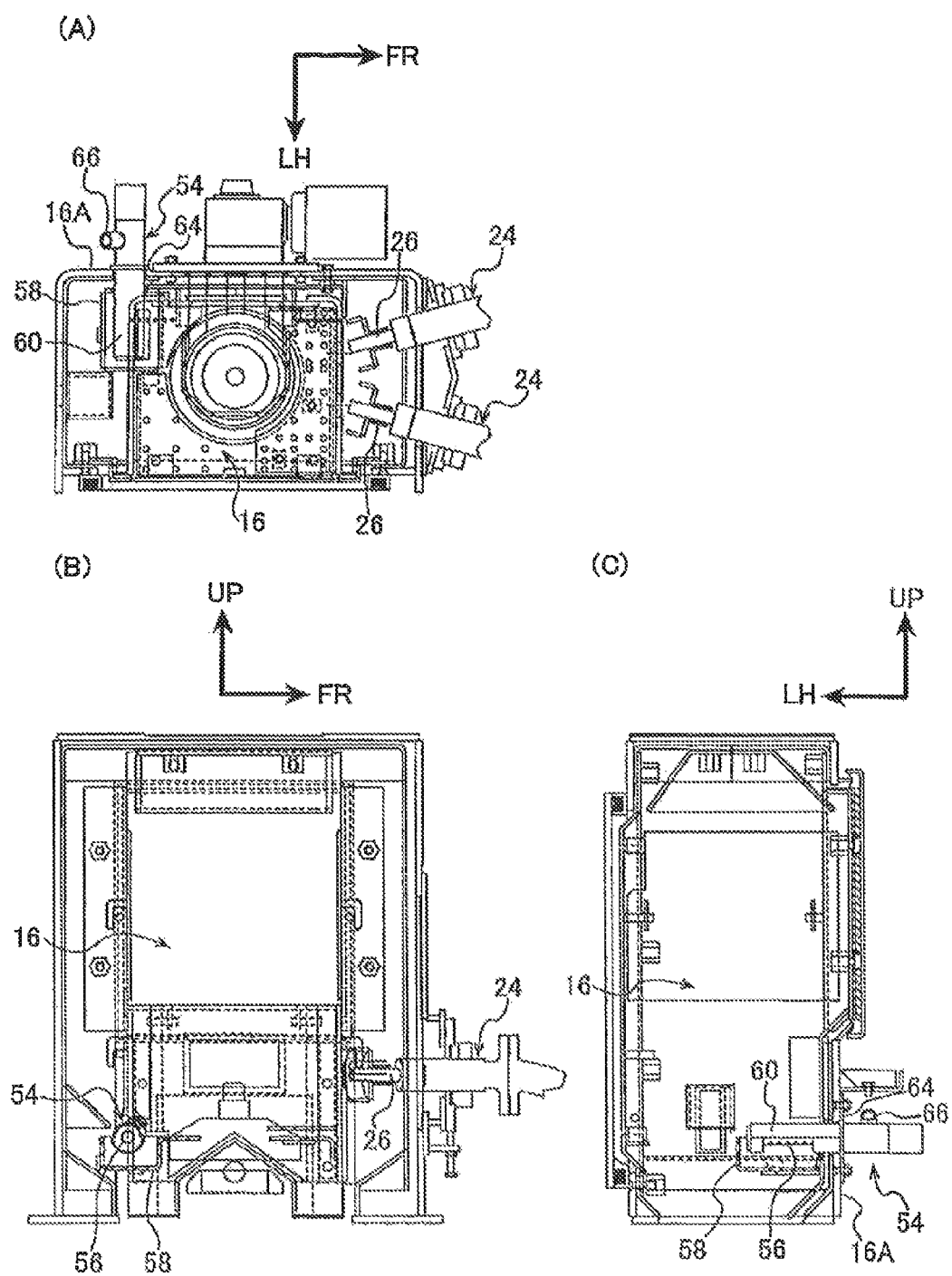
FIG. 7 is a schematic structural drawing showing one end of a piping for transporting air for a discharge and its periphery, of an embodiment of the present invention.
Figure 8:
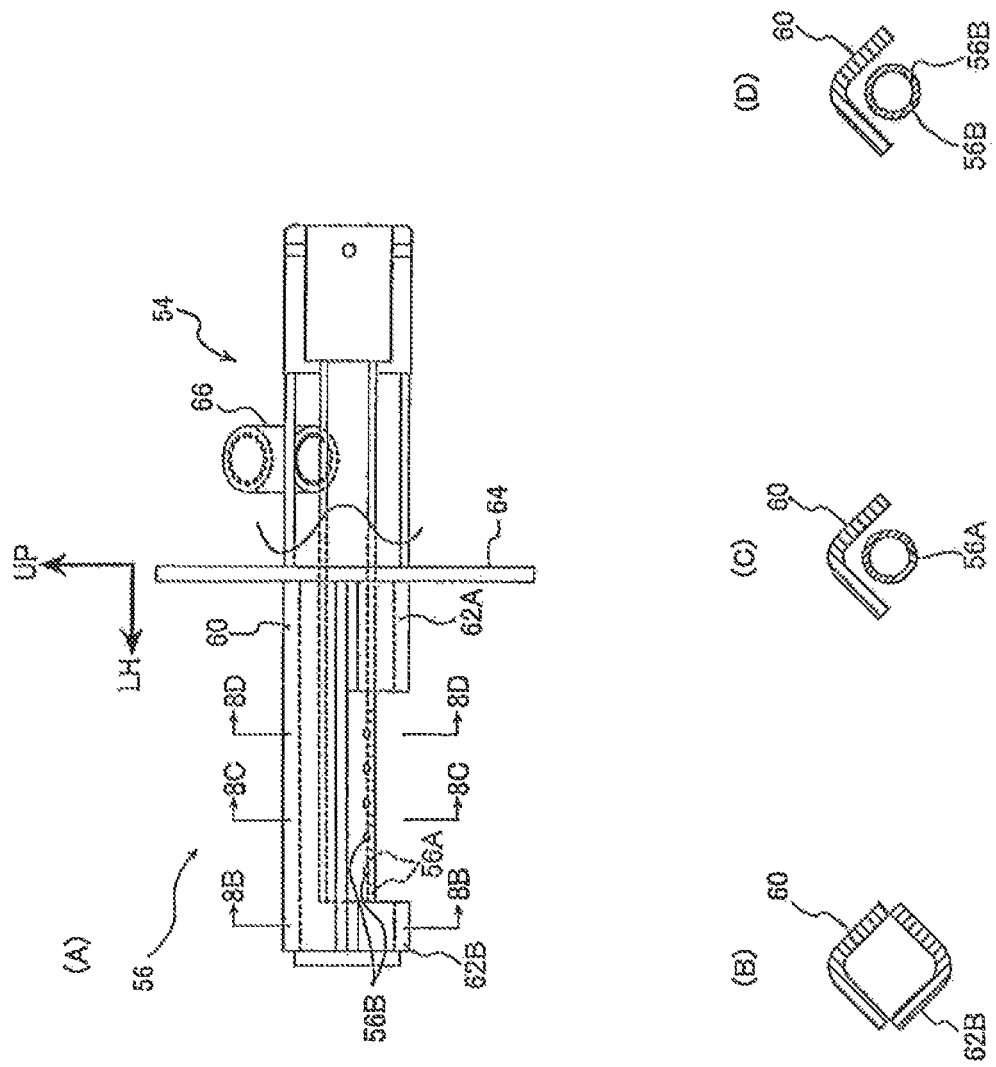
FIG. 8 illustrates the one end of a piping for transporting air for a discharge of an embodiment of the present invention.

As shown in FIG. 7, the one end of the piping for transporting air for a discharge 54 has a flange 64 that is fixed to a side wall 16A that separates the room for projecting the shots 16. It also has a suction piping 56 that is nearly horizontally disposed and inserted into the room for projecting the shots 16. As in FIG. 8, a plurality of holes 56A, 56B that face downwardly are formed in the outer circumference of the suction piping 56. More precisely, the holes 56A as in FIG. 8(A) and FIG. 8(C) are open in a vertical and downward direction and are equally spaced along the axial direction of the suction piping 56. The holes 56B as in FIG. 8(A) and FIG. 8(D) are obliquely open in a downward direction and are equally spaced along the axial direction of the suction piping 56. The holes 56A and the holes 56B are arranged to be at different heights, i.e., to be staggered as seen in the bottom view of the suction piping 56.

Above the suction piping 56 an upper cover 60 is provided for covering the suction piping 56 in the room for projecting the shots 16 (see FIG. 7). The upper cover 60 has a cross-section that is perpendicular to the axis of the suction piping 56 and is shaped as an inverted V. Below the upper cover 60 and at the portion outside the area of the suction piping 56 where the holes 56A, 58B are formed and near the flange 64, a lower cover 62A is provided for covering the bottom of the suction piping 56. The lower cover 62A has a cross-section that is perpendicular to the axis of the suction piping 56 and is shaped as a V. Below the upper cover 60 and at the portion outside the area of the suction piping 56 where the holes 56A, 58B are formed and beyond the flange 64, a lower cover 62B is provided that has the cross-section perpendicular to the axis of the suction piping 56, which cross-section has the same shape as that of the lower cover 62A.

As shown in FIG. 7, a receiver 58 is provided at the one end of the piping for transporting air for a discharge 54. It is disposed inside the room for projecting the shots 16 and is shaped like a container to receive shots below the suction piping 56. A piping for introducing fresh air 66 is connected to the position of the piping for transporting air for a discharge 54 that is located outside the room for projecting the shots 16 near the one end of the piping for transporting air for a discharge 54. Air outside the room for projecting the shots 16 can be introduced to the inside of the piping for transporting air for a discharge 54 through the piping for introducing fresh air 66.

Figure 9:
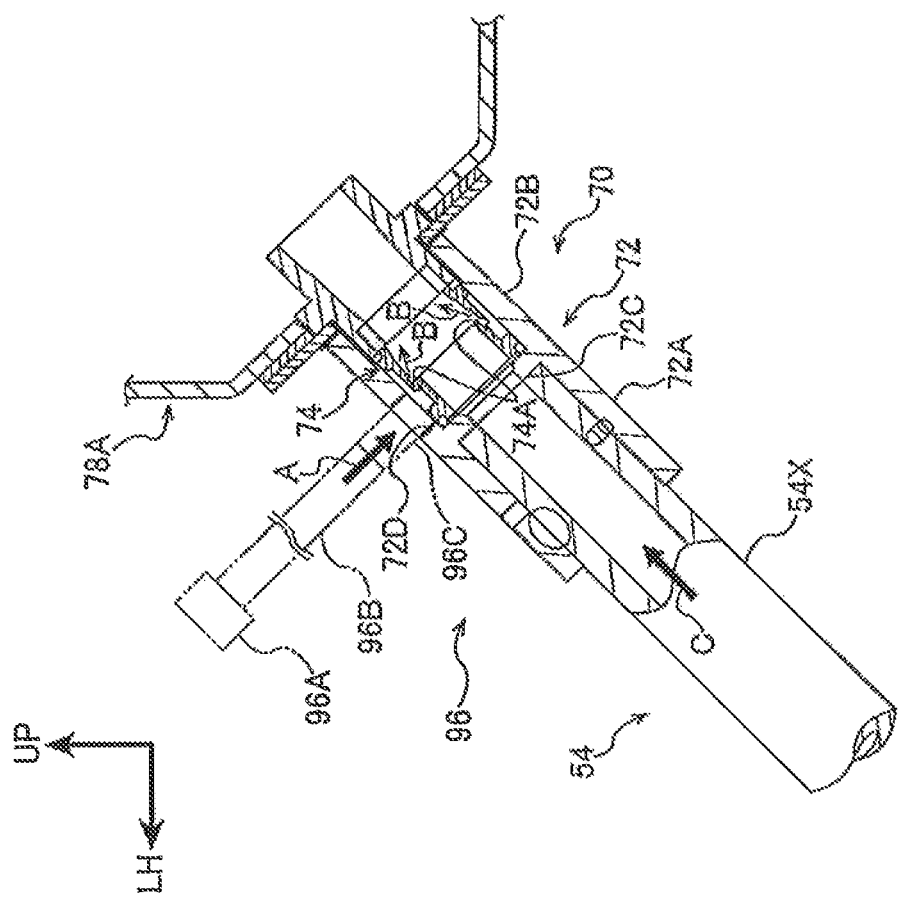
FIG. 9 is a vertical cross-sectional view of the front of the shot-peening apparatus showing an enlarged view of the other end of the piping for transporting air for a discharge of the shot-peening apparatus of an embodiment of the present invention.

As shown in FIG. 5, the other end of the piping for transporting air for a discharge 54 is connected to a vibrating screen 68 through a box for collection 78A and a pipe 78B. FIG. 9 illustrates an enlarged sectional and front view of the conjunction of the other end of the piping for transporting air for a discharge 54 and the box for collection 78A. As in FIG. 9, at the other end of the piping for transporting air for a discharge 54 a tube of an ejector 70 is fixed to an edge of a front end of a body of the piping for transporting air for a discharge 54X.

The tube of the ejector 70 comprises an outer tube of the ejector 72 and an inner tube of the ejector 74. The outer tube of the ejector 72 comprises a base tube 72A that is disposed on the outer peripheral side of a discharge 54X and an end tube 72B that is disposed closer the box for collection 78A side than the base tube 72A is to the box 78A. On the inner face of the end tube 72B the stopper 72C that is abutted by the edge of a front end of the piping for transporting air for a discharge 54X is formed toward the inner and radial direction. A hole for supplying compressed air 72D is formed to penetrate the end tube 72B so that a tube for pumping gas 96B is connected to that hole 72D via an adaptor 96C. The tube for pumping gas 96B has an on-off valve and is connected to a compressed air source 96A (shown by a block). That is, compressed air (gas) flows into the hole for supplying compressed air 72D from the compressed air source 96A through the adaptor 96C and the tube for pumping gas 96B (see the arrow A in the figure).

The inner tube of the ejector 74 is located inside the end tube 72B of the outer tube of the ejector 72. A plurality of holes for spraying air 74A are formed to penetrate the inner tube of the ejector 74 so that the inside of the inner tube of the ejector 74 is communicated with the hole for supplying compressed air 72D. The holes for spraying air 74A incline to the side opposite the stopper 72C and toward the inner and radial direction to spray compressed air that flows into the hole for supplying compressed air 72D toward the vibrating screen 68 (see the arrow B in the figure). That is, the ejector 96, which includes the tube of the ejector 70, the adaptor 96C, and the tube for pumping gas 96B, is provided at the other end of the piping for transporting air for a discharge 54. It suctions shots at the side of the one end of the piping for transporting air for a discharge 54 by causing gas to flow through the piping for transporting air for a discharge 54 to the box for collection 78A (to the edge of the other end of the piping for transporting air for a discharge 54). The arrow C in FIG. 9 denotes the direction of shots being suctioned.

Figure 12:
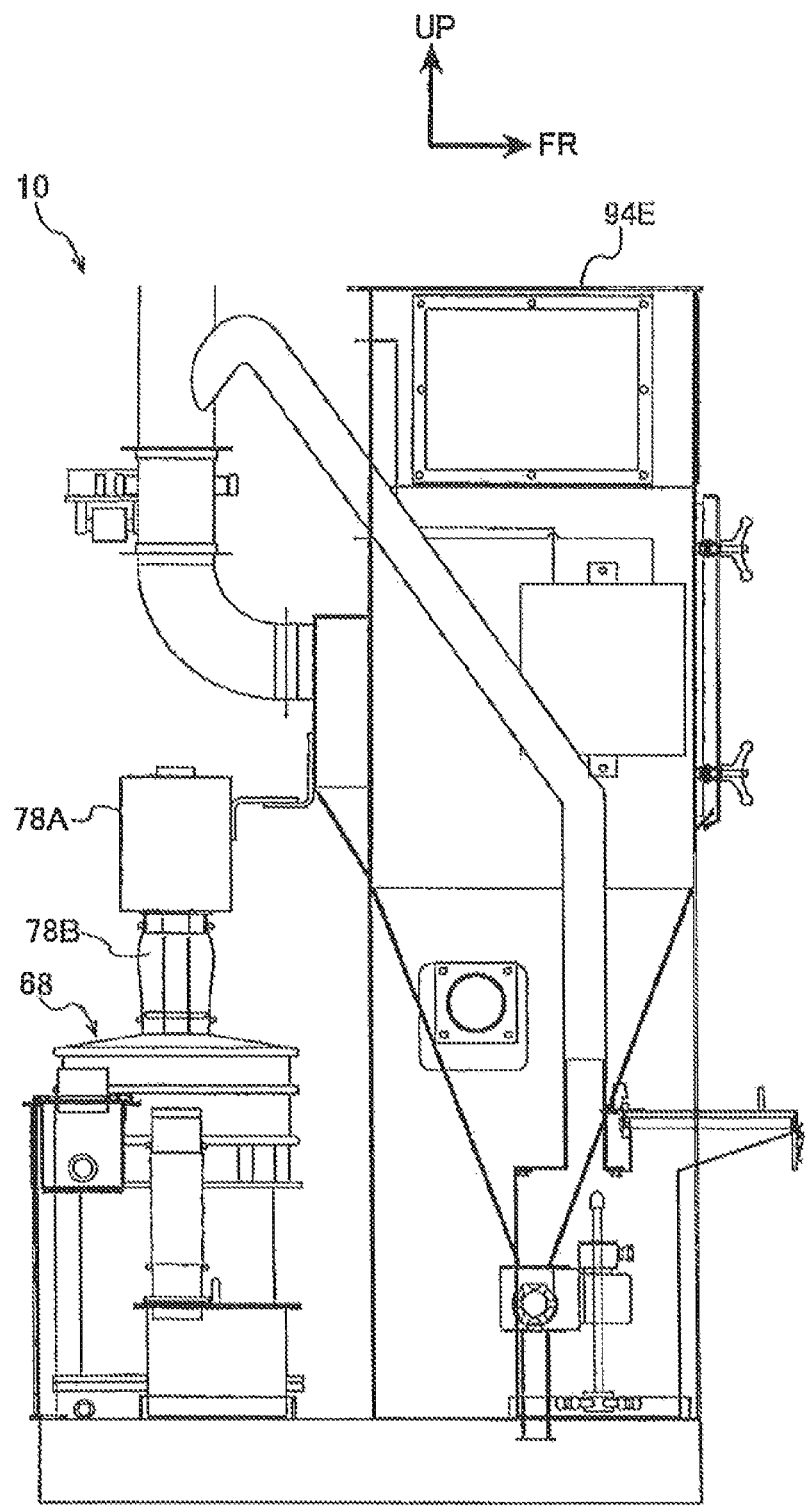
FIG. 12 is a schematic structural drawing showing a cross-section taken along the line 12S-12S in FIG. 5.

The vibrating screen 68 shown in FIG. 5 and in FIG. 12 (a schematic structural drawing showing an enlarged cross-section taken along the line 12S-12S in FIG. 5) comprises a hollow body, a screen that is disposed in the body, and a vibrator for vibrating the screen, which vibrator is disposed in the body, though no details are given below. In the vibrating screen 68 a mixture is supplied to the screen. The mixture contains shots that have been separated by the settling chamber 94D that is shown in FIG. 5, shots that are suctioned by the piping for transporting air for a discharge 54, and powdery foreign substances. When the mixture is supplied, the screen is vibrated by the vibrator. The vibrating screen 68 separates and removes foreign substances that have particles of different sizes from the mixture by screening particles of the powder that are smaller than a predetermined size to discharge the mixture other than the foreign substances from a discharging port 68A.

Figure 10:
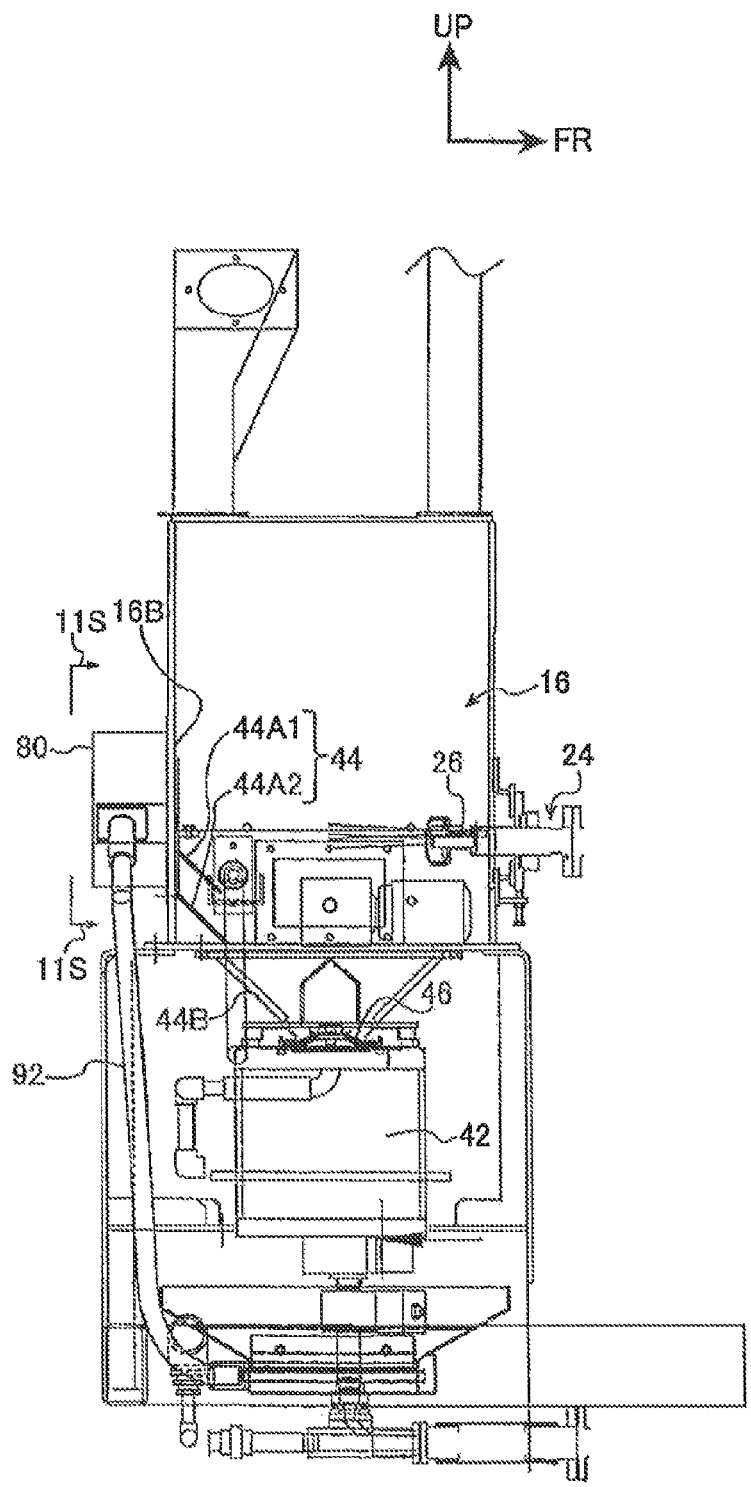
FIG. 10 is an enlarged view taken along the arrows 10S-10S in FIG. 5.

The discharging port 68A of the vibrating screen 68 is connected to one end of a piping for transporting air for a supply 76, which is the second piping, via a box for a discharge 78C. The configuration of the one end of the piping for transporting air for a supply 76 is the same as that of the one end of the suction piping 56 (see FIGS. 7 and 8). That is, components that correspond to the through-holes 56A, 56B, the receiver 58, and the upper cover 60 in FIGS. 7 and 8 are provided to the one end of the piping for transporting air for a supply 76. The other end of the piping for transporting air for a supply 76 that is shown in FIG. 5 is connected to the box 80 (see FIG. 10) that is disposed at the rear of the room for projecting the shots 16. In FIG. 5 the components that are located on the near side of the box 80 are shown by two-dot chain lines and the box 80 is shown as being transparent. As shown in FIG. 10, which is an enlarged view taken along the arrows 10S-10S in FIG. 5, the box 80 is provided by being separated by the back wall 16B of the room for projecting the shots 16 to form a separate room. It is located above the pressure tank 42. It constitutes a space that can be communicated with the pressure tank 42. That is, the box 80 is communicated with the room for projecting the shots 16 and to the pressure tank 42 through the upper portion of the hopper 44A, the lower portion of the hopper 44B, and the poppet valve 46.

Figure 11:
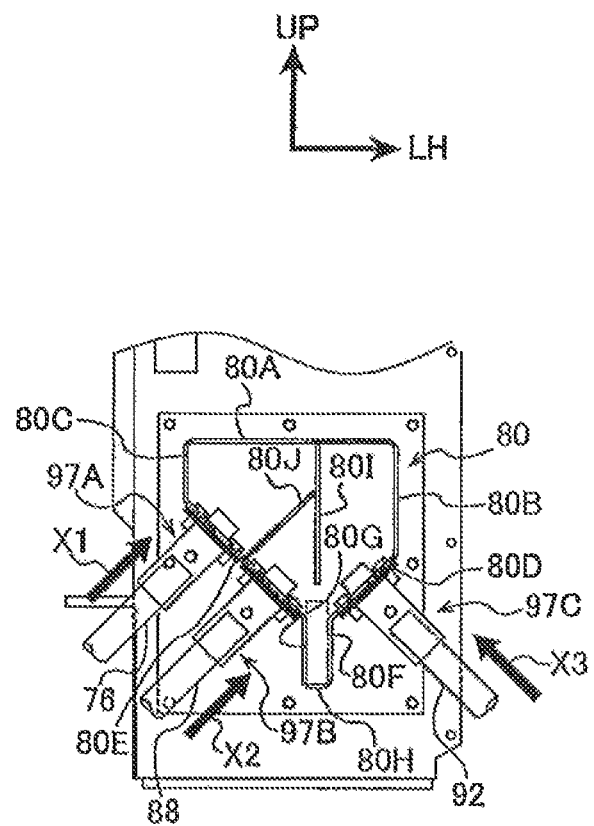
FIG. 11 is a schematic structural drawing showing an enlarged view taken along the arrows 11S-11S in FIG. 5 with the board on the rear having been removed.

FIG. 11 illustrates an enlarged rear view taken along the arrows 11S-11S in FIG. 10 with the rear board of the box 80 being removed. As shown in FIG. 11, the box 80 comprises a top wall 80A, side walls 80B, 80C that are vertically suspended from both sides of the top wall 80A, inclined lower walls 80D, 80E that downwardly incline from the lower ends of the pair of side walls 80B, 80C to come close to each other, side walls for a discharging port 80F, 80G that are vertically suspended from the lower ends of the pair of inclined lower walls 80D, 80E, and a bottom wall for a discharging port 80H that horizontally connects the lower ends of the pair of side walls for a discharging port 80F, 80G. The lower end of the side wall 80C, which is shown at the left side in the figure (the right side of the apparatus), is positioned above the lower end of the side wall 80B, which is shown at the right side in the figure (the left side of the apparatus). The space surrounded by the pair of side walls for a discharging port 80F, 80G and the bottom wall for a discharging port 80H faces a space between the upper ends of the pair of upper and lower ramps 44A1, 44A2 of the upper portion of the hopper 44A, which is shown in FIG. 10.

The other end of the piping for transporting air for a supply 76 that is shown in FIG. 11 is inserted into the box 80 with its flange being fixed to the upper portion of the inclined lower walls 80E. It can discharge shots from the other end. Specifically, an ejector 97A that has a similar configuration to that of the ejector 96 (see FIG. 9) is provided to the other end of the piping for transporting air for a supply 76. That is, the other end of the piping for transporting air for a supply 76 can suction shots near the discharging port 68A of the vibrating screen 68 shown in FIG. 5 by the suction by the ejector 97A to discharge shots into the box 80 shown in FIG. 11. In FIG. 11 the direction of the flow of the shots is shown by the arrow X1.

Figure 6:
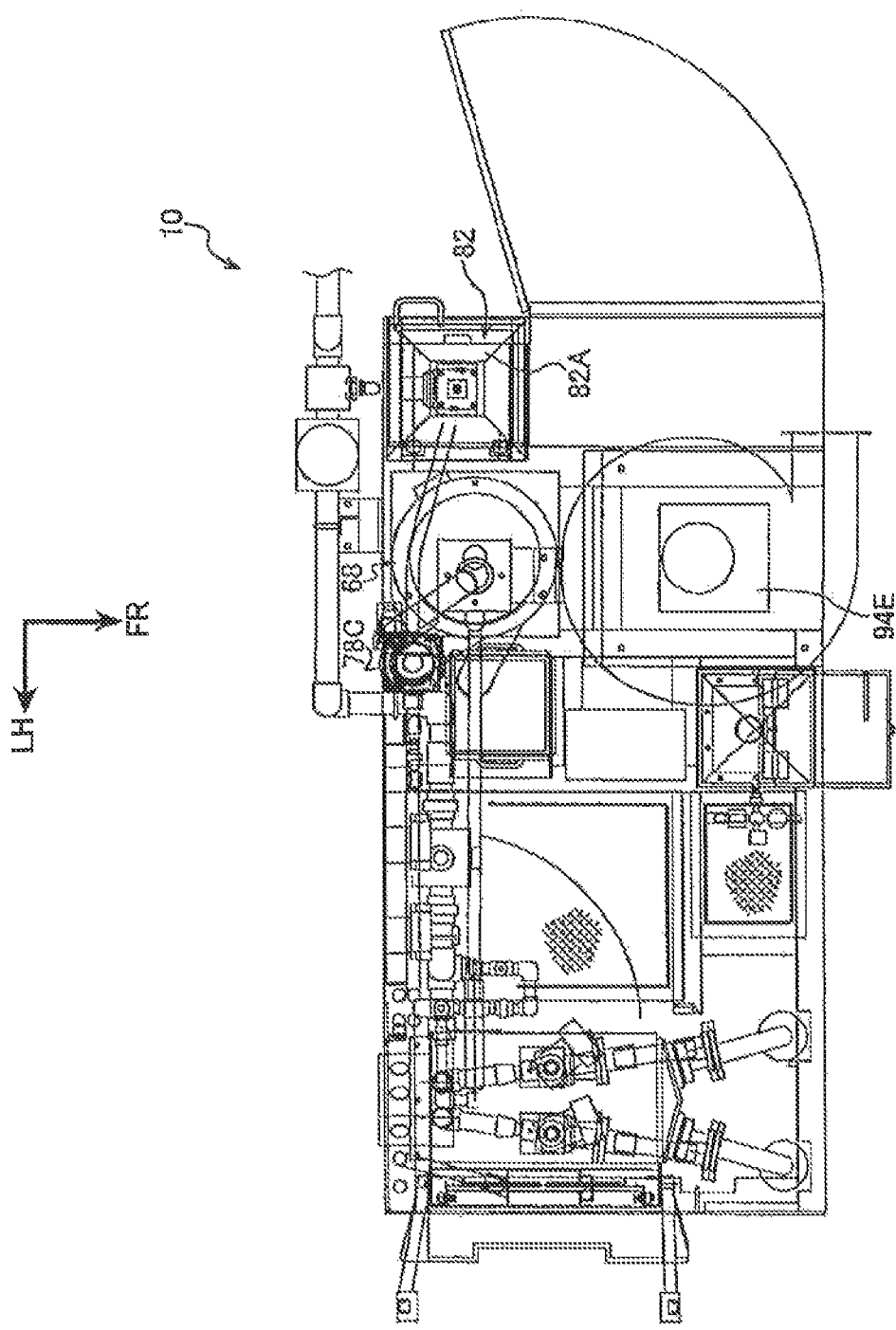
FIG. 6 is a plan view of a schematic structural drawing to illustrate the system for circulation of an embodiment of the present invention.

As shown in FIGS. 5 and 6, the resupplying tank 82 is provided, to the shot-peening apparatus 10. It is located adjacent to the right side of the vibrating screen 68. A resupplying port 82 for resupplying shots to the resupplying tank 82 is formed on the top of it (see FIG. 6). A screen (not shown) for preventing foreign substances from entering the resupplying tank 82 is provided to the upper portion of the resupplying tank 82.

FIG. 13 illustrates the lower end of the resupplying tank 82 and configuration thereunder. As shown in FIG. 13, a shutoff valve 84 is provided at the bottom of the resupplying tank 82. The discharging portion of the resupplying tank 82 is connected to one end of a piping for transporting air for a resupply 88, which is the third piping, via the shutoff valve 84. The shutoff valve 84 that is provided under the resupplying tank 82 as in FIG. 13 is driven by a driving cylinder 86 and controlled by the control unit to be opened and closed. In addition to the shutoff valve 84, a duct for suction 90 is provided to the one end of the piping for transporting air for a resupply 88. Fresh air can be introduced to the one end of the piping for transporting air for a resupply 88 from the duct for suction 90. The arrows Y1, Y2 in FIG. 13(A) denote the directions of the flow of shots.

As shown in FIG. 11, the other end of the piping for transporting air for a resupply 88 is connected to, and inserted into, the box 80, with the flange of the piping 88 being fixed to the lower portion of the inclined lower walls 80E. The piping for transporting air for a resupply 88 can discharge shots from the other end. Specifically, an ejector 97B that has a similar configuration to that of the ejector 96 (see FIG. 9) is provided to the other end of the piping for transporting air for a resupply 88. That is, the other end of the piping for transporting air for a resupply 88 can suction shots that have been supplied from the resupplying tank 82 shown in FIG. 5 by the suction by the ejector 97B to discharge shots into the box 80 shown in FIG. 11. In FIG. 11 the direction of the flow of the shots is shown by the arrow X2.

The resupplying tank 82, the shutoff valve 84, the duct for suction 90, and the piping for transporting air for a resupply 88, which are shown in FIG. 5, constitute a mechanism to resupply shots when the amount of shots in the pressure tank 42 is short. Under the control by the control unit, shots are suctioned by the ejector at the other end (the side of the box 80) of the piping for transporting air for a resupply 88 to resupply shots. During the suction the shutoff valve 84 is opened. In this way shots that have flowed from the resupplying tank 82 to the one end of the piping for transporting air for a resupply 88 through the shutoff valve 84 flow through the piping for transporting air for a resupply 88 with air that has been sucked from the duct for suction 90 to be discharged into the box 80.

In the shot-peening apparatus 10 a hopper 98 is disposed below the lowermost position of the door 18. One end of the piping for transporting air for return 92, which is the fourth piping, is disposed in the hopper 98. The configuration of the one end of the piping for transporting air for return 92 is similar to that of the one end of the suction piping 56 (see FIGS. 7 and 8). That is, components that correspond to the through-holes 56A, 56B and the upper cover 60 in FIGS. 7 and 8 are provided to the one end of the piping for transporting air for return 92. As shown in FIG. 5, the other end of the piping for transporting air for return 92 is connected to the box 80. As shown in FIG. 11, the other end of the piping for transporting air for return 92 is inserted into the box 80 with its flange being fixed to the inclined lower walls 80D. The piping for transporting air for return 92 can discharge shots from the other end. Specifically, an ejector 97C that has a similar configuration to that of the ejector 96 (see FIG. 9) is provided to the other end of the piping for transporting air for return 92. That is, the other end of the piping for transporting air for return 92 can suction shots that have dropped from the room for projecting the shots 16 by the suction by the ejector 97C to discharge shots into the box 80 as shown in FIG. 11. The shots drop from the room 16 when the door 18 as shown in FIG. 5 is opened or closed (moves up and down). In FIG. 11 the direction of the flow of the shots is shown by the arrow X3.

In the box 80, partitions 80I, 80J are formed to divide the spaces that are adjacent to respective edges of the front ends of the piping for transporting air for a supply 76, the piping for transporting air for a resupply 88, and the piping for transporting air for return 92. The partitions 80I, 80J divide the space in the box 80 so as not to mix air that is discharged from the edge of the front end of the piping for transporting air for a supply 76, the piping for transporting air for a resupply 88, or the piping for transporting air for return 92, with air from the edge of another piping (i.e., so as not to disturb a discharge by another piping).

Operation and Effects of the Embodiment

Below, the operation and effects of the embodiment are discussed.

When shot peening is carried out, an object to be processed 12 is placed on the table 20 in the room for projecting the shots 16. Then the door 18 is moved up. The holder 22A is moved down to hold the object to be processed 12 from above. Then the table 20 is rotated. The object to be processed 12 and the holder 22A are driven by it to rotate. In this state shots are projected from the nozzle 26 to process the object to be processed 12 by shot peening. When the shot peening is terminated, projecting the shots from the nozzle 26 is stopped. After the rotation of the table 20 is stopped, the holder 22A is moved up. Then the door 18 is moved down to the open position so that an operator can take the object 12 out. In this way the whole process is completed.

Next, the reuse of shots is discussed. As shown in FIG. 4, the pressure tank 42 is disposed below the projecting position 24X, where shots are projected onto the object to be processed 12 by the projecting device 24. Shots that have been projected are received, by the pressure tank 42. The pressure tank 42 is configured to be pressurized and the discharging portion of it can be communicated with the route for supplying the shots of the projecting device 24. Thus the shots that have been received by the pressure tank 42 can be returned to the projecting device 24 to be reused.

As shown in FIG. 5, the one end of the piping for transporting air for a discharge 54 is disposed between the projecting position 24X and the pressure tank 42. The piping for transporting air for a discharge 54 can suction shots near the one end (the side of the room for projecting the shots 16). Thus shots near the one end are suctioned by the piping for transporting air for a discharge 54. Specifically, the hopper 44 for receiving the shots that have been projected is disposed between the projecting position 24X and the pressure tank 42. It is connected to the one end of the piping for transporting air for a discharge 54. Thus the shots that have been projected are efficiently suctioned from the one end of the piping for transporting air for a discharge 54.

Now, suctioning shots is discussed in detail. As shown in FIG. 9, the ejector 96 is provided to the other end of the piping for transporting air for a discharge 54. Compressed air is caused to flow toward the other end through the piping for transporting air for a discharge 54. Thus shots and air near the one end (the side of the room for projecting the shots 16) are suctioned into the piping for transporting air for a discharge 54. As shown in FIGS. 7 and 8, at the one end of the piping for transporting air for a discharge 54 the suction piping 56 is nearly horizontally disposed in the room for projecting the shots 16. A plurality of holes 56A, 56B that open downwardly are formed in the suction piping 56. The receiver 58, which is shaped like a container, receives shots below the suction piping 56. Thus shots that have been received by the receiver 58 are suctioned through the plurality of holes 56A, 56B of the suction piping 56. Further, air is suctioned from the opening of the one end of the suction piping 56. Thus shots that are mixed with air are caused to flow through the piping for transporting air for a discharge 54.

In this embodiment the upper cover 60 is provided above the suction piping 56 to cover the suction piping 56 from above in the room for projecting the shots 16. Thus, if the shots that have been projected drop on the one end of the piping for transporting air for a discharge 54, they bump the upper cover 60. Therefore the chances of causing abrasion on the suction piping 56 are decreased. Further, since the cross-section of the upper cover 60, which is perpendicular to the axis of the suction piping 56, is shaped as an inverted V, the shots that bump the upper cover 60 drop at the side, which is a little distant from the suction piping 56. Thus the suction piping 56 is seldom buried in shots.

As shown in FIG. 7, in this embodiment the piping for introducing fresh air 66 is connected to the one end of the piping for transporting air for a discharge 54 at the position outside the room for projecting the shots 16 so that air outside the room for projecting the shots 16 is introduced into the piping for transporting air for a discharge 54 through the piping for introducing fresh air 66. Thus if the suction piping in the room for projecting the shots 16 were to be filled with shots, air would be introduced into the piping for transporting air for a discharge 54 via the one end to maintain the shots being suctioned.

As shown in FIG. 5, the other end of the piping for transporting air for a discharge 54 is connected to the vibrating screen 68 so that a mixture containing shots and powdery foreign substances suctioned into the piping for transporting air for a discharge 54 is caused to flow to the vibrating screen 68. The foreign substances, which have different size particles, are separated and removed by the vibrating screen 68 so that the mixture, other than the foreign substances, is discharged from the discharging port 68A of the vibrating screen 68.

The discharging port 68A of the vibrating screen 68 is connected to the one end of the piping for transporting air for a supply 76. The other end of the piping for transporting air for a supply 76 is located above the pressure tank 42 and disposed in a space that is communicated with the pressure tank 42. It can discharge shots from the other end. Thus the shots of appropriate sizes that are discharged from the discharging port 68A of the vibrating screen 68 are supplied to the pressure tank 42 and are discharged from other end of the piping for transporting air for the supply 76. Thus no large circulating machine is needed, so that the apparatus can be downsized.

In this embodiment, as shown in FIG. 10, the box 80 that constitutes a room that is separate from the room for projecting the shots 16 and is communicated with the room for projecting the shots 16 is provided. As shown in FIG. 11, the other end of the piping for transporting air for a supply 76 is connected to the box 80. Thus the shots that have been projected in the room for projecting the shots 16 (see FIG. 10) are prevented from entering the other end of the piping for transporting air for a supply 76, or the chances of doing so are effectively decreased. Thus the shots of appropriate sizes that have been discharged from the discharging port 68A of the vibrating screen 68 are more stably discharged from the other end of the piping for transporting air for a supply 76.

In this embodiment the discharging portion of the resupplying tank 82, where shots can be resupplied, is connected to the one end of the piping for transporting air for a resupply 88, which is located above the pressure tank 42. It is disposed in a space that is communicated with the pressure tank 42. The piping for transporting air for a resupply 88 can discharge shots from the other end. Thus the shots of appropriate sizes that have been supplied from the resupplying tank 82 are supplied to the pressure tank 42 from the other end of the piping for transporting air for a resupply 88.

In this embodiment, since the other end of the piping for transporting air for a resupply 88 is connected to the box 80, the shots that have been projected in the room for projecting the shots 16 are prevented from entering the other end of the piping for transporting air for a resupply 88, or the chances of doing so are effectively decreased. Thus the shots of appropriate sizes that have been supplied from the resupplying tank 82 are more stably discharged from the other end of the piping for transporting air for a resupply 88.

As discussed above, by the shot-peening apparatus 10 of this embodiment the apparatus can be downsized and the sizes of shots can be made to be appropriate.

In this embodiment shots that have dropped under the door 18 are supplied to the pressure tank 42 via the box 80 by the piping for transporting air for return 92.

Additional Discussion of the Embodiment

In the above discussion of the embodiment, the apparatus for processing an object by projecting shots thereon is the shot-peening apparatus 10. However, the apparatus may be a shot-blasting apparatus.

In the above embodiment the separator is the vibrating screen 68. However, the separator may be another type of separator, for example, a revolving screen. The revolving screen comprises a screen that is a cylinder with a plurality of holes and revolves about an axis. A mixture containing shots and powdery foreign substances are caused to flow inside the screen while the screen is revolving. The revolving screen rolls the mixture to separate and remove foreign substances from the mixture.

In the above embodiment the piping for transporting air for a discharge 54, which is the first piping, is connected to the hopper 44. This configuration is preferable, but the first piping may be connected to a position between the projecting position (24X) and the pressure tank (42) other than the hopper (44).

In the above embodiment the piping for transporting air for a discharge 54 has the ejector 96 at the other end and the suction piping 56 and the receiver 58 at the one end (see FIG. 7), to suction shots near the one end. The first piping may suction shots near the one end by another means, such as a blower for generating a vacuum at the one end.

In the above embodiment, as shown in FIGS. 7 and 8, the upper cover 60 above the suction piping 56 is provided to the piping for transporting air for a discharge 54. This configuration is preferable, but a configuration where the upper cover 60 is not provided above the suction piping 56 can be used.

In the above embodiment the piping for introducing fresh air 66 is provided to the one end of the piping for transporting air for a discharge 54. This configuration is preferable, but a configuration where no piping for introducing fresh air is provided to the one end of the first piping can be used.

In the above embodiment, as shown in FIG. 11, the other end of the piping for transporting air for a supply 76, which is the second piping, is connected to the box 80. This configuration is preferable, but the other end of the second piping may be connected to a position in the room for projecting the shots other than the box (80), e.g., the side wall. If the other end of the second piping is connected to the side wall of the room for projecting the shots, a means for preventing the shots that have been projected from entering the other end of the second piping is preferably provided.

In the above embodiment the other end of the piping for transporting air for a resupply 88, which is the third piping, is connected to the box 80. This configuration is preferable, but the other end of the third piping may be connected to a position in the room for projecting the shots other than the box (80), e.g., the side wall. If the other end of the third piping is connected to the side wall of the room for projecting the shots, a means for preventing the shots that have been projected from entering the other end of the third piping is preferably provided.

In the above embodiment, as shown in FIG. 5, the resupplying tank 82 and the piping for transporting air for a resupply 88, which is the third piping, are provided. This configuration is preferable, but a configuration where neither a resupplying tank nor a third piping is provided can be used.

In the above embodiment the other end of the piping for transporting air for a supply 76 and the other end of the piping for transporting air for a resupply 88 are commonly connected to the box 80. However, a box to which the other end of the second piping is connected and a box to which the other end of the third piping is connected are separately provided.

In the above embodiment the piping for transporting air for return 92, which is the fourth piping, is provided. This configuration is preferable, but a configuration where the piping for transporting air for return 92 is not provided can be used.

The above embodiment and any of the changes may be combined and carried out.

Below, the major reference numerals that are used in the detailed description and drawings are collectively listed.

10 a shot-peening apparatus (an apparatus for processing an object by projecting shots thereon)
 12 an object to be processed
 16 a room for projecting the shots
 18 a door
 24 a projecting device (a device for projecting shots)
 24X a projecting position
 42 a pressure tank
 44 a hopper
 54 a piping for transporting air for a discharge (the first piping)
 56 a suction piping
 56A, 56B a through-hole
 58 a receiver
 60 an upper cover
 66 a piping for introducing fresh air
 68 a vibrating screen (a separator)
 76 a piping for transporting air for a supply (the second piping)
 80 a box
 82 a resupplying tank
 88 a piping for transporting air for a resupply (the third piping)

92 a piping for transporting air for return (the fourth piping)

96 an ejector

The invention claimed is:

1. An apparatus for processing an object by projecting shots thereon comprising:
   a device for projecting shots onto an object to be processed that is located in a room for projecting the shots,
   a pressure tank being disposed below a projecting position where the object is projected by the device, the pressure tank receiving shots that have been projected, the pressure tank being configured to be pressurized inside, the pressure tank having an outlet that is communicated with a route for supplying the shots in the device;
   a first piping having one end that is disposed between the projecting position and the pressure tank, the first piping being able to suction the shots near the one end;
   a separator being connected to the other end of the first piping, the separator separating and removing foreign substances from a mixture containing the suctioned shots and powdery foreign substances, the separator discharging the mixture other than the foreign substances through a discharging port, wherein the foreign substances have particles that have different sizes than those of the shots;
   a second piping having one end that is connected to the discharging port of the separator, the other end being located above the pressure tank and communicated with a space that is connected to the pressure tank, the second piping being able to discharge the shots from the other end,
   wherein at the other end of the first piping an ejector is provided to cause gas to flow into the first piping toward the other end, and at the one end of the first piping a suction piping and a container-like receiver that receives shots below the suction piping are provided, wherein the suction piping is almost horizontally disposed in the room for projecting the shots and has a plurality of holes on the outer circumference of the piping, which holes open downwardly.

2. The apparatus for processing an object by projecting shots thereon of claim 1,
   wherein a hopper for receiving shots that have been projected is disposed between the projecting position and the pressure tank and the one end of the first piping is connected to the hopper.

3. The apparatus for processing an object by projecting shots thereon of claim 1 or 2,
   wherein an upper cover is provided above the suction piping, which cover covers the upper portion of the suction piping in the room for projecting the shots and is shaped as an inverted V in a cross-section perpendicular to the axis of the suction piping.

4. The apparatus for processing an object by projecting shots thereon of claim 3,
   wherein the one end of the first piping outside the room for projecting the shots is connected to a piping for introducing fresh air, wherein fresh air outside the room for projecting the shots can be introduced into the first piping through the piping for introducing fresh air.

5. The apparatus for processing an object by projecting shots thereon of claim 1 or 2, further comprising:
   a box that constitutes a room other than the room for projecting the shots and that is communicated with the room for projecting the shots, wherein the other end of the second piping is connected to the box.

6. The apparatus for processing an object by projecting shots thereon of claim 1 or 2, further comprising:
   a tank for resupplying shots and;
   a third piping having one end that is connected to a discharging portion of the tank for resupplying shots and the other end that is disposed in a space above the pressure tank to be communicated with the pressure tank, wherein the third piping can discharge the shots from the other end.

7. The apparatus for processing an object by projecting shots thereon of claim 6, further comprising:
   a box that constitutes a room other than the room for projecting the shots and that is communicated with the room for projecting the shots, wherein the other end of the third piping is connected to the box.

8. The apparatus for processing an object by projecting shots thereon of claim 1 or 2, further comprising:
   a door that is provided to a gate for carrying the object to be processed in and out of the room for projecting the shots; and
   a fourth piping that has one end to be disposed below the door and another end that is disposed in a space that is located above the pressure tank and that is communicated with the pressure tank, wherein the fourth piping can discharge the shots from the other end.

* * * * *